(12) United States Patent
Zhu (10) Patent No.: US 10,975,987 B1
(45) Date of Patent: Apr. 13, 2021

(54) FIXTURE FOR MOUNTING LINE PIPE AND OPERATION METHOD THEREOF

(71) Applicant: Gong Zhu, Shenzhen (CN)

(72) Inventor: Gong Zhu, Shenzhen (CN)

(73) Assignee: SHENZHEN AIRUIXING INDUSTRIAL DESIGN CO., LTD., Shenzhen (CN)

( * ) Notice: Subject to any disclaimer, the term of this patent is extended or adjusted under 35 U.S.C. 154(b) by 0 days.

(21) Appl. No.: 17/074,655

(22) Filed: Oct. 20, 2020

(30) Foreign Application Priority Data

Nov. 18, 2019 (CN) .......................... 201911126023.6

(51) Int. Cl.
| | | |
|---|---|---|
| *F16L 3/21* | (2006.01) | |
| *F16B 2/12* | (2006.01) | |
| *F16L 3/205* | (2006.01) | |
| *F16L 57/06* | (2006.01) | |
| *H02G 3/04* | (2006.01) | |
| *F16B 2/06* | (2006.01) | |
| *H02G 3/32* | (2006.01) | |

(52) U.S. Cl.
CPC .................... *F16L 3/21* (2013.01); *F16B 2/12* (2013.01); *F16L 3/2056* (2013.01); *F16B 2/065* (2013.01); *F16L 57/06* (2013.01); *H02G 3/04* (2013.01); *H02G 3/0456* (2013.01); *H02G 3/32* (2013.01)

(58) Field of Classification Search
CPC ........... F16L 3/21; F16L 3/2056; F16L 57/06; H02G 3/32; H02G 3/04; H02G 3/0456; F16B 2/12; F16B 2/065
See application file for complete search history.

(56) References Cited

U.S. PATENT DOCUMENTS

| 4,979,273 A | * | 12/1990 | Friedrickson, Jr. | ........ F16B 2/12 24/514 |
| 2004/0169119 A1 | * | 9/2004 | Crowell | .................. B25B 5/163 248/316.4 |
| 2005/0141957 A1 | * | 6/2005 | Chen | ......................... F16B 2/12 403/290 |

FOREIGN PATENT DOCUMENTS

| CN | 207150434 U | 3/2018 |
| CN | 108631235 A | 10/2018 |
| CN | 209389629 U | 9/2019 |

* cited by examiner

Primary Examiner — Eret C McNichols (57) ABSTRACT

A fixture has a pedestal set on a wall by a fixing device, a bracing plate is fixedly connected to a side wall of the pedestal away from the wall, an upper end of the bracing plate is provided with a supporting device, a lifting recess is provided on a side wall of the pedestal away from the wall, an end of the lifting recess away from the bracing plate penetrates the pedestal, a lifting block is slidingly connected to the lifting recess, an end of the lifting block away from the lifting recess is fixedly connected with a clamping plate, the clamping plate is provided with a clamping device, a threaded hole is provided at an end of the clamping plate away from the lifting block.

5 Claims, 5 Drawing Sheets

FIXTURE FOR MOUNTING LINE PIPE AND OPERATION METHOD THEREOF

CROSS-REFERENCE TO RELATED APPLICATIONS

This application claims priority benefit of Chinese Patent Application No. 201911126023.6 filed on 18 Nov. 2019. The above-referenced application is hereby incorporated herein by reference.

BACKGROUND OF THE INVENTION

The invention relates to line pipe installations, especially to fixtures for mounting line pipe of weak current engineering of the Internet of Things.

The Internet of Things is an important part of new generation of information technology, and weak current engineering is a classification of power applications. In weak current project of the Internet of Things, in order to make cables successfully complete the transmission work, it is necessary to use corresponding line pipe to install the weak current cable. In order to prevent weak current signals from being affected by external electric magnetic fields during transmission, galvanized steel pipes are often used as line pipes in weak current projects. In addition, corresponding installation and fixing structures are required to install and fix line pipes. The existing line pipe installation and fixing device is a simple metal installation bracket. When line pipes are installed, in order to fix line pipes firmly, a complicated fixing operation may be required, which may greatly reduce installation efficiency. In addition, galvanized steel pipes as weak line pipes are very easy to rub against the bracket during fixing process, which may destroy galvanized layers, and then affect shielding effect of the galvanized steel pipe, and affect transmission work in weak current project.

BRIEF SUMMARY OF THE INVENTION

The present invention aims to provide a fixture for mounting line pipe so as to solve the shortcomings in the prior art. For example, an existing line pipe installation and fixing device is complicated to operate during fixing, which may greatly reduces installation efficiency, and it may be easy to damage galvanized layers of galvanized steel pipes as a weak line pipe during fixing processes, making line pipes unable to function properly. Shielding effect of this will affect normal transmission of weak current project.

Such object is achieved by providing a fixture for mounting line pipe as defined in claim 1, further advantageous according to the invention will be apparent from the dependent claims.

The present invention provides a fixture for mounting line pipe, the fixture comprises a pedestal set on a wall, the pedestal is set on the wall by a fixing device, a bracing plate is fixedly connected to a side wall of the pedestal away from the wall, an upper end of the bracing plate is provided with a supporting device, a lifting recess is provided on a side wall of the pedestal away from the wall, the lifting recess is away from the bracing plate, an end of the lifting recess away from the bracing plate penetrates the pedestal, a lifting block is slidingly connected to the lifting recess, an end of the lifting block away from the lifting recess is fixedly connected with a clamping plate, the clamping plate is provided with a clamping device, a threaded hole is provided at an end of the clamping plate away from the lifting block, a threaded rod threads in the threaded hole, an end of the threaded rod close to the bracing plate is rotatably connected to the bracing plate. The clamping device comprises a clamping rod fixedly connected to a side wall of the clamping plate close to the bracing plate, the clamping rod is arranged opposite to a center of a placing recess, an end of the clamping rod close to the placing recess is fixedly connected with a first clamping block, two sliding chambers symmetrical to the clamping rod are provided in the clamping plate, a side wall of the sliding chamber close to the placing recess and a side wall away from the placing recess each are provided with a communication chamber, and each end of the two communication chambers away from the sliding chamber penetrates the clamping plate, a sliding base is slidingly connected with the sliding chamber, an internal thread of the sliding base is penetrated by a threaded clamping rod, both ends of the threaded clamping rod penetrate the two communication chambers respectively, an end of the threaded clamping rod close to the placing recess is rotatably connected with a connecting block, an end of the connecting block away from the threaded clamping rod is fixedly linked with two symmetrically arranged fixing trays, a clamping shaft is fixedly connected between the two fixing trays, a rotating tray is rotatably connected to the clamping shaft.

The invention further provides an operation method for mounting a fixture for mounting line pipe, the method comprises steps:

S1 step of fixing a pedestal, aligning a screw with a prefabricated thread recess and turning the screw to make the pedestal fit a wall.

S2 step of line pipe placement, placing a line pipe on a rubber blanket.

S3 step of clamping and fixing line pipe, aligning a lifting block with a lifting recess, aligning a threaded hole with a threaded rod, turning a rotating ring while pushing a clamping plate to lower the clamping plate, stop pushing the clamping plate and stop rotating the rotating ring when the clamping plate is lowered to a designated position.

S4 step of tightening a line pipe, rotating a threaded clamping rod to push a connecting block, a fixing tray, a clamping shaft, a clamping tray, a second clamping block and a protective blanket for tightening and clamping of the line pipe.

Advantageous Effects

In this device, a user uses a threaded rotation of the threaded rod in the threaded hole to make the entire clamping plate and the clamping device drive the lifting block to slide in the lifting recess, and then complete a combination work of clamping and fixing. The user can conveniently complete the clamping and fixing work of line pipe, and installation efficiency of the line pipe is greatly improved. Arrangement of clamping device and supporting device itself enables line pipes of different shapes and sizes to be effectively clamped and fixed, and the arrangement of clamping device and supporting device makes line pipes not hurt during the clamping and fixing process. Galvanized layer on surface of the line pipe can be protected, and the line pipe can successfully complete shielding work, ensuring normal progress of transmission work in weak current project.

When line pipe squeezes the support device and shifts due to its own weight, a user can turn the threaded controlling rod to adjust height of the support device to keep the line pipe in a fixed position and the line pipe will not tilt, which is beneficial to improve line pipe safety.

BRIEF DESCRIPTION OF THE SEVERAL VIEWS OF THE DRAWINGS

Further characteristics and advantages of the invention will emerge from the description of preferred, but not exclusive embodiments of an fixture for mounting line pipe according to the invention, non-limiting examples of which are provided in the attached drawings, in which.

LIST OF REFERENCE CHARACTERS 1. wall;
2. pedestal;
3. bracing plate;
4. lifting recess;
5. lifting block;
6. clamping plate;
7. threaded hole;
8. threaded rod;
9. prefabricated thread recess;
10. screw;
11. pressing recess;
12. pressing plate;
13. pressing spring;
14. barcing recess;
15. sliding recess;
16. sliding block;
17. holder;
18. placing recess;
19. adjusting recess;
20. adjusting block;
21. supporting plate;
22. rubber blanket;
23. adjusting spring;
24. threaded controlling rod;
25. clamping rod;
26. first clamping block;
27. sliding chamber;
28. communication chamber;
29. sliding base;
30. threaded clamping rod;
31. connecting block;
32. fixing tray;
33. clamping shaft;
34. rotating tray;
35. second clamping block;
36. protective blanket;
37. rotating ring;
38. groove;
39. vertical rib;
40. baffle plate;
41. blind hole.

DETAILED DESCRIPTION OF THE INVENTION

Embodiment 1

Figure 1:
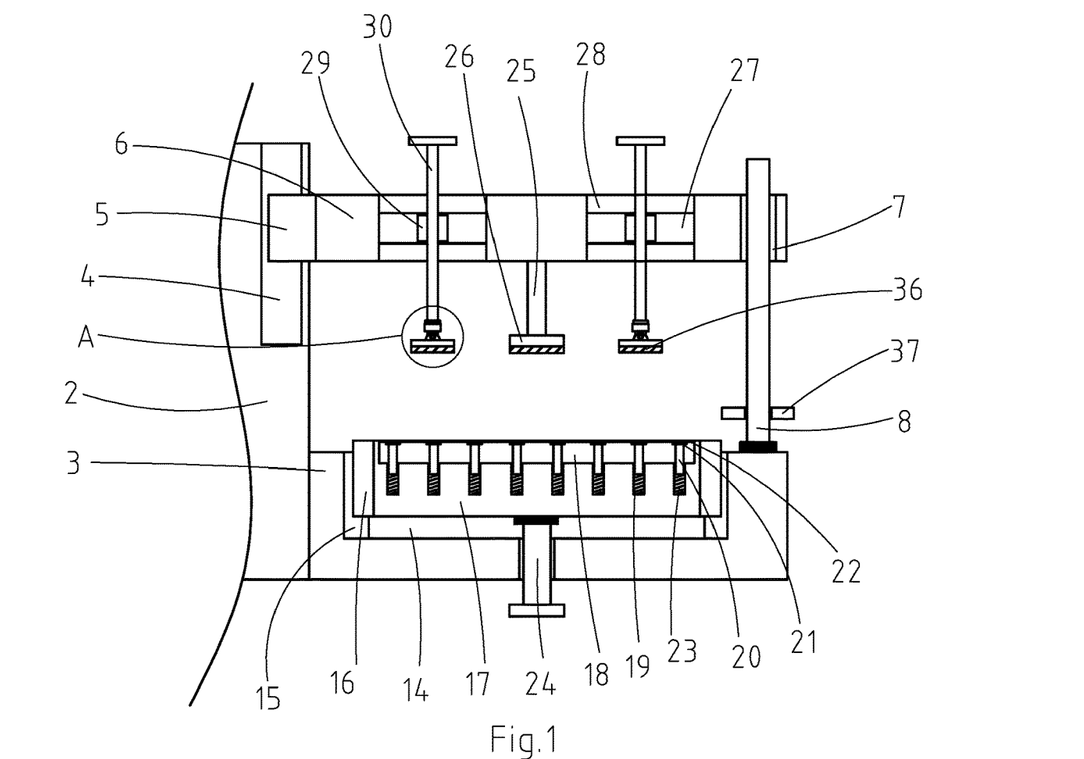
FIG. 1 is a front sectional drawing of a fixture for mounting line pipe of the invention.
Figure 3:
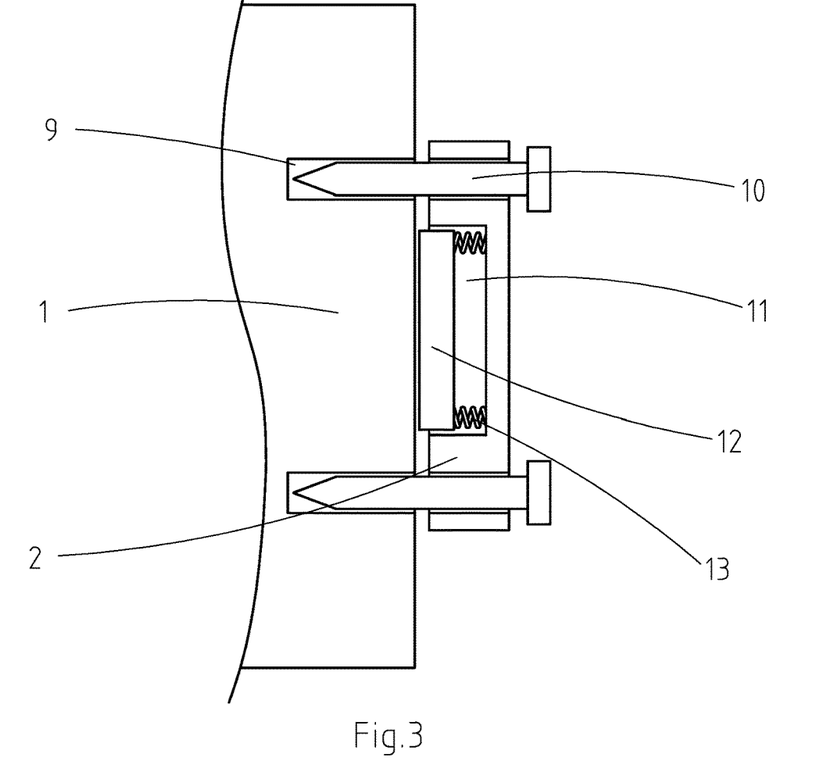
FIG. 3 is a front sectional drawing of a fixing device of a fixture for mounting line pipe of the invention.

FIG. 1 shows a fixture for mounting line pipe for weak current project of the Internet of Things, the fixture comprises a pedestal 2 set on a wall 1, the pedestal 2 is set on the wall 1 by a fixing device, the fixing device comprises four prefabricated thread recesses 9 arranged symmetrically with each other on the wall 1, the four prefabricated thread recesses 9 are all threadedly connected with screws 10, each end of the four screws 10 away from the prefabricated thread recesses 9 passes through the pedestal 2. Arrangement of the prefabricated thread recess 9 allows four screws 10 to quickly fix the pedestal 2 to the wall 1 through a threaded connection. A pressing recess 11 is provided on a side wall of the pedestal 2 close to the wall 1, a pressing plate 12 is slidingly connected to the pressing recess 11, a side wall of the pressing plate 12 away from the wall is provided with a plurality of symmetrically arranged pressing springs 13, an end of each one of the plurality of pressing springs 13 away from the pressing plate 12 is fixedly connected to an inner wall of the pressing recess 11, as shown in FIG. 3. Arrangement of the pressure spring 13 increases squeezing force between the pressing plate 12 and the wall 1 and pressure of the screw 10 in the prefabricated thread recesses 9, which in turn increases frictional force, so the pedestal 2 can be stably fixed on the wall 1, thereby increasing the overall device stability.

Referring to FIG. 1, a bracing plate 3 is fixedly connected to a side wall of the pedestal 2 away from the wall 1, an upper end of the bracing plate 3 is provided with a supporting device. The supporting device comprises a bracing recess 14 arranged on a side wall of the bracing plate 3 close to the clamping plate 6, two opposite side walls in the bracing recess 14 both are provided with sliding recesses 15, two sliding blocks 16 are slidingly connected to the two sliding recesses 15, two side walls of the two sliding blocks 16 close to each other are fixedly connected with a holder 17, the holder 17 is slidingly connected to the bracing recess 14. The sliding recess 15 and the sliding block 16 enable the holder 17 to slide up and down in the bracing recess 14 stably, and then the holder 17 can smoothly complete a lifting work. A placing recess 18 is provided on a side wall of the holder 17 away from the bracing recess 14, a plurality of adjusting recesses 19 arranged at equal intervals are provided on an inner wall of the placing recess 18 close to the bracing recess 14, adjusting blocks 20 are slidingly connected to the plurality of adjusting recesses 19, ends of the plurality of adjusting blocks 20 away from the adjusting recess 19 are all fixedly connected with a supporting plate 21. Arrangement of supporting plate 21 can better complete a support for line pipe. Ends of the plurality of supporting plates 21 away from the adjusting block 20 are jointly fixedly connected with a rubber blanket 22, the rubber blanket 22 is made of rubber material. Since rubber has good insulation, good elasticity and good plasticity, the rubber blanket 22 is arranged so that the supporting plate 21 does not damage surface of the line pipe when supporting it. Therefore, galvanized layer on galvanized steel pipe surface of the line pipe is intact, which in turn enables the line pipe to complete shielding work smoothly, ensuring normal progress of transmission work of weak current project. An end of the adjusting block 20 away from the supporting plate 21 is fixedly connected with an adjusting spring 23, an end of the adjusting spring 23 away from the adjusting block 20 is fixedly connected to an inner wall of the adjusting recess 19. A plurality of the supporting plates 21 are pushed by pressure of the line pipe through the rubber blanket 22 to push the adjusting block 20, and the adjusting block 20 squeezes the adjusting spring 23. Since the adjusting springs 23 at different positions receive different pressing forces, lowering distance of the supporting plates 21 is also different. Therefore, the supporting plates 21 fully fits surface of the line pipe with the help of the rubber blanket 22 to support and clamp line pipes of different shapes and sizes.

A threaded controlling rod 24 is rotatably connected to a side wall of the holder 17 away from the placing recess 18, rotating connection makes rotation of the threaded controlling rod 24 not interfered by the holder 17. An end of the threaded controlling rod 24 away from the holder 17 threads through the bracing plate 3.

Thread penetration makes the threaded controlling rod 24 rise and fall during rotation, and then push the holder 17 to complete lifting action. When the line pipe is placed on the rubber blanket 22, the line pipe pushes the supporting plates 21 down, the line pipe itself also drops, as a result, the line pipe will be tilted. The line pipe is a galvanized steel pipe with high strength, inclination of the line pipe causes a fixed position of the line pipe to move down, causing the line pipe to twist and cause the line pipe to be injured. At this time, turn the threaded controlling rod 24 to push the holder 17 during lifting process, and then the line pipe is pushed to an original position, the line pipe is no longer in a tilted state, so that the line pipe will not be hurt by twisting, which further guarantees a normal transmission work in weak current project.

Figure 5:
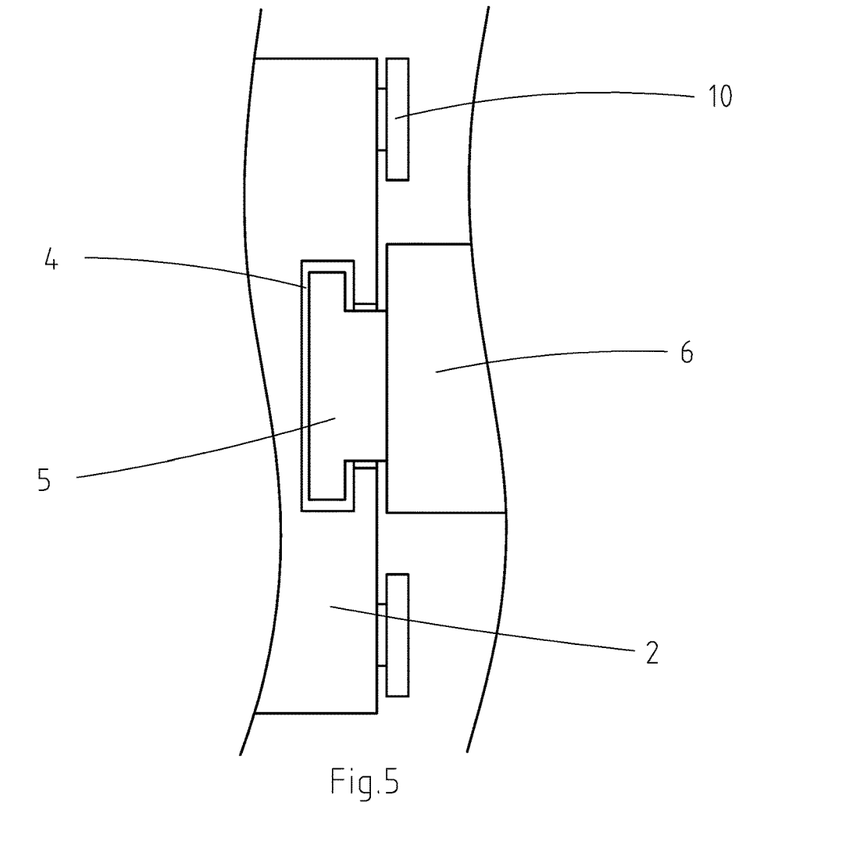
FIG. 5 is a front sectional drawing of a lifting recess of a fixture for mounting line pipe of the invention.

Referring to FIG. 5, a lifting recess 4 is provided on a side wall of the pedestal 2 away from the wall 1, the lifting recess 4 is away from the bracing plate 3, an end of the lifting recess 4 away from the bracing plate 3 penetrates the pedestal 2. A lifting block 5 is slidingly connected to the lifting recess 4, an end of the lifting block 5 away from the lifting recess 4 is fixedly connected with a clamping plate 6. Such arrangement enables the lifting block 5 to be separated from the lifting recess 4, and then drives the clamping plate 6 and the clamping device to leave the pedestal 2, so that the line pipe can be conveniently placed on the supporting device. The lifting recess 4 is T-shaped, a shape of the lifting block 5 matches a shape of the lifting recess 4. Arrangement of T-shaped structure enables the lifting block 5 to slide stably in the lifting recess 4, the lifting block 5 can only perform lifting displacement, and cannot perform rotation and displacement in other directions. In this way, the clamping plate 6 can only move up and down, the clamping plate 6 does not rotate or shift, thereby ensuring stability of the clamping plate 6.

Figure 4:
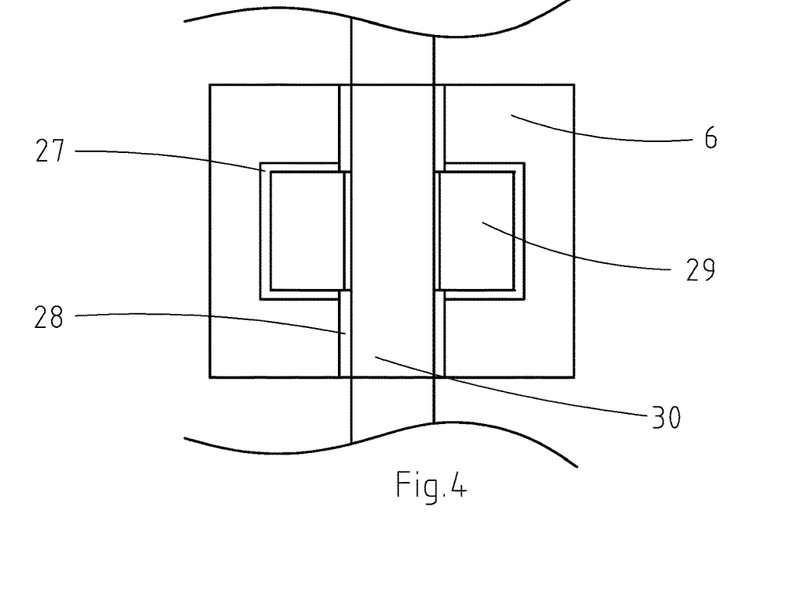
FIG. 4 is a side sectional drawing of a clamping device of a fixture for mounting line pipe of the invention.

The clamping plate 6 is provided with a clamping device, the clamping device comprises a clamping rod 25 fixedly connected to a side wall of the clamping plate 6 close to the bracing plate 3, the clamping rod 25 is arranged opposite to a center of a placing recess 18, an end of the clamping rod 25 close to the placing recess 18 is fixedly connected with a first clamping block 26, two sliding chambers 27 symmetrical to the clamping rod 25 are provided in the clamping plate 6, a side wall of the sliding chamber 27 close to the placing recess 18 and a side wall away from the placing recess 18 each is provided with a communication chamber 28, each end of the two communication chambers 28 away from the sliding chamber 27 penetrates the clamping plate 6, a sliding base 29 is slidingly connected with the sliding chamber 27, an internal thread of the sliding base 29 is penetrated by a threaded clamping rod 30, as shown in FIG. 4. Arrangement of the sliding chamber 27 enables the sliding base 29 to slide freely to a suitable position, and then drives the threaded clamping rod 30 to slide to a suitable position to clamp line pipes of different sizes.

Figure 2:
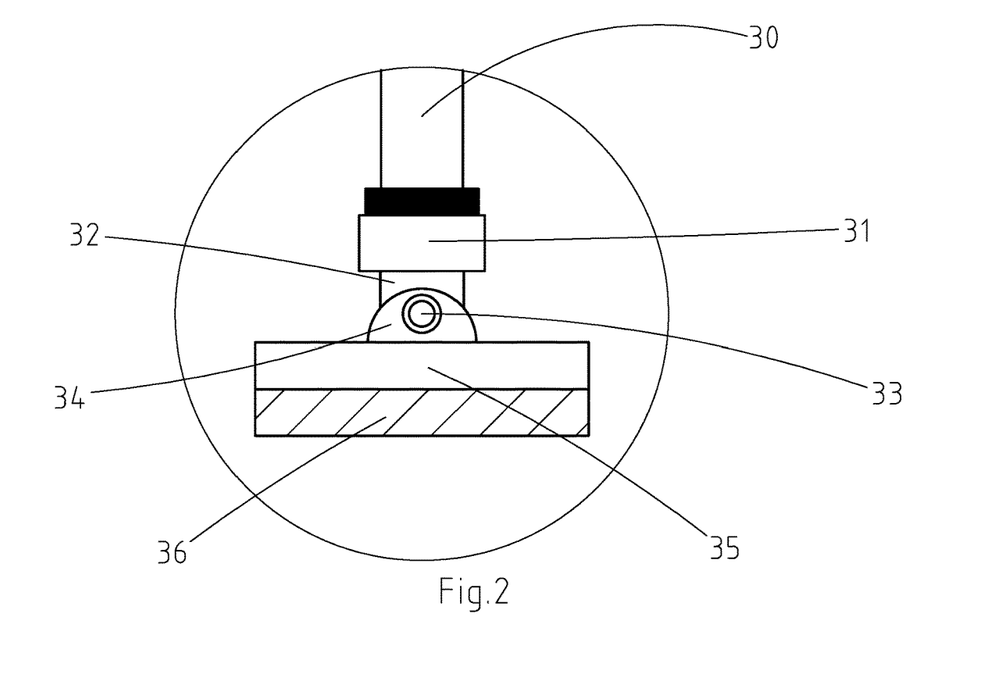
FIG. 2 is a partial enlarged view of A in FIG. 1.

Both ends of the threaded clamping rod 30 penetrates the two communication chambers 28 respectively, arrangement of the communication chamber 28 makes movement of the threaded clamping rod 30 not interfered, and threaded connection between the threaded connecting rod 30 and the sliding base 29 makes height of the threaded connecting rod 30 adjustable, so that clamping work of different sizes of line pipes can be further completed. An end of the threaded clamping rod 30 close to the placing recess 18 is rotatably connected with a connecting block 31, an end of the connecting block 31 away from the threaded clamping rod 30 is fixedly linked with two symmetrically arranged fixing trays 32, a clamping shaft 33 is fixedly connected between the two fixing trays 32, a rotating tray 34 is rotatably connected to the clamping shaft 33, a second clamping block 35 is fixedly connected to an end of the rotating tray 34 away from the clamping shaft 33, as shown in FIG. 2. Such arrangement makes the second clamping block 35 achieve a free rotation, such rotation help the second clamping block 35 to fit surface of line pipe to clamp line pipes with different sizes. Each end of both the second clamping block 35 and the first clamping block 26 close to the placing recess 18 has a protective blanket 36, the protective blanket 36 is made of rubber material. Since rubber has good insulation, good elasticity, good plasticity and good friction performance, it can complete clamping work closely and protects line pipes from being damaged by clamping, shielding work of line pipe can be completed smoothly, transmission work in weak current project can be carried out normally. A threaded hole 7 is provided at an end of the clamping plate 6 away from the lifting block 2, a threaded rod 8 is threaded in the threaded hole 7, an end of the threaded rod 8 close to the bracing plate 3 is rotatably connected to the bracing plate 3. A threaded connection between the threaded hole 7 and the threaded rod 8 enables the threaded rod 8 to drive the clamping plate 6 to move up and down and lock it at a designated position. When the threaded rod 8 is separated from the threaded hole 7, movement of the clamping plate 6 is not restricted by the threaded rod 8, so that the clamping plate 6 is not interfered with line pipe placement.

A rotating ring 37 is fixedly connected to the threaded rod 8, the rotating ring 37 is arranged close to the bracing plate 3. Arrangement of the rotating ring 37 enables a user to rotate the threaded rod 8 simply and conveniently.

Embodiment 2

Figure 6:
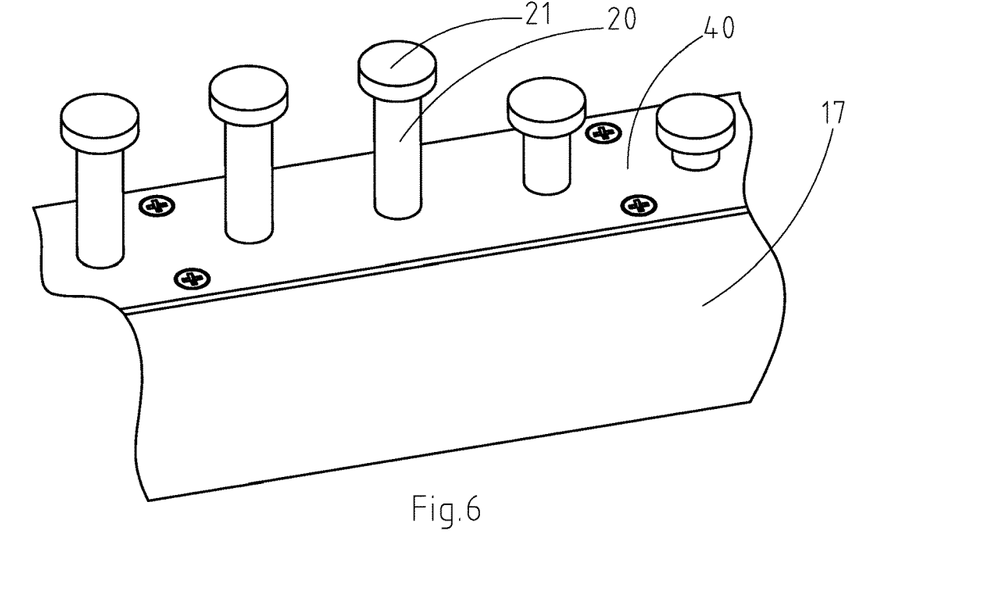
FIG. 6 is a 3d-drawing of a cooperation between an adjusting recess, an adjusting block and a baffle plate.

Referring to FIG. 6, a baffle plate 40 is arranged to the placing recess 18, the baffle plate 40 and a holder 17 are disassembled and connected by means of screw fastening, an adjusting block 20 penetrates through the baffle plate 40 and slides with the baffle plate 40. By setting a baffle plate 40, the adjusting block 20 is still partially retained in an adjusting recess 19 under elastic force of an adjusting spring 23, so as to avoid a phenomenon that the adjusting block 20 is separated from the adjusting recess 19 due to elastic force of the adjusting spring 23 before the fixture is used.

Figure 7:
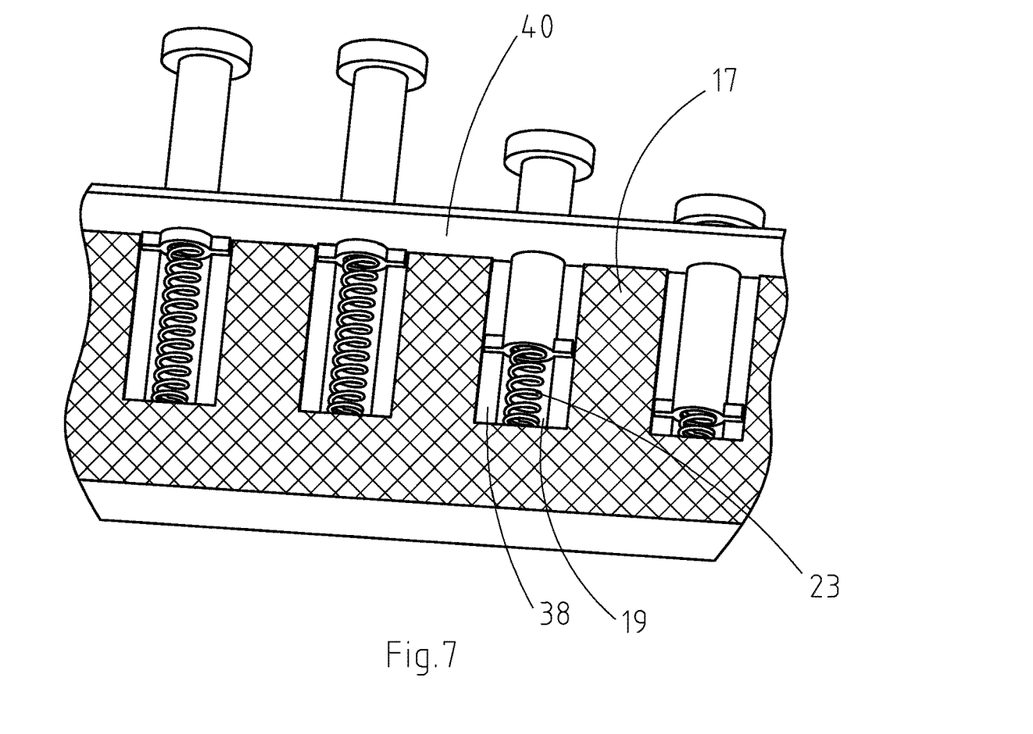
FIG. 7 is a 3d-sectional drawing of a cooperation between an adjusting recess, an adjusting block and a baffle plate.
Figure 8:
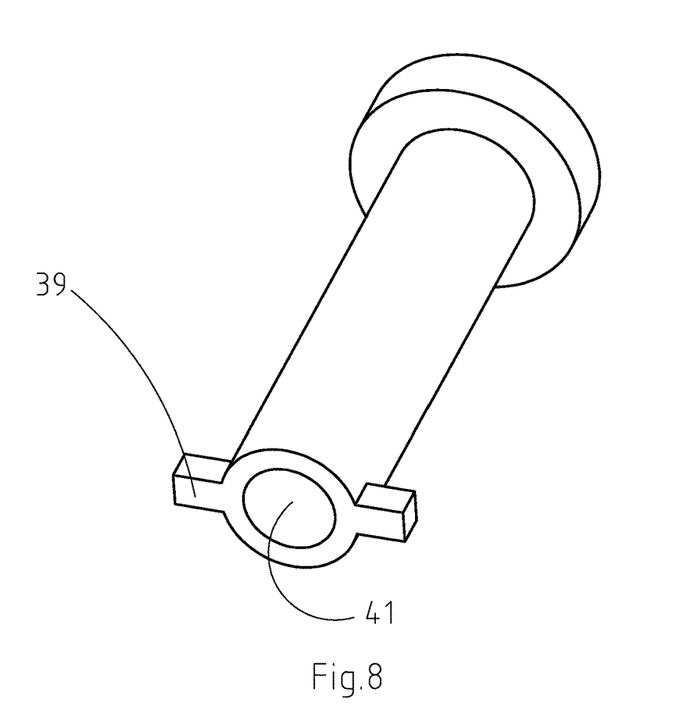
FIG. 8 is a 3d-drawing of an adjusting block of the invention.
Figure 9:
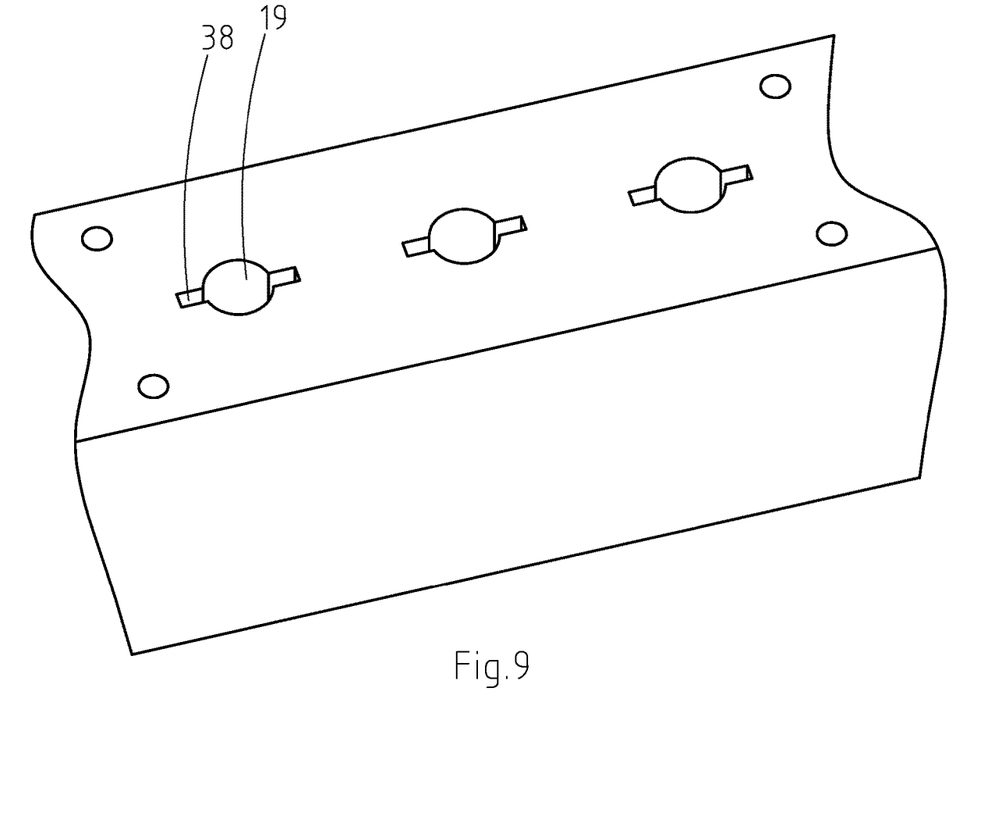
FIG. 9 is a 3d-drawing of a holder of the invention.

Referring to FIG. 9, an inner wall of the adjusting recess 19 is provided with a radially outward recess 38 along its axial direction. An outer wall of the adjusting block 20 close to an end of the adjusting spring 23 is provided with a radially outward vertical rib 39 along its axial direction, as shown in FIG. 8. The vertical rib 39 is in sliding fit with the recess 39, as shown in FIG. 7. The adjusting block 20 is also coaxially provided with a blind hole 41, which is used to partially receive the adjusting spring 23. The vertical rib 39 of the adjusting block 20 abuts against the baffle plate 40 under elastic force of the adjusting spring 23, due to limiting effect of the baffle plate 40, the adjusting block 20 does not leave the adjusting recess 19.

Embodiment 3

This embodiment discloses an operation method for mounting fixture for mounting line pipe in weak current project of the Internet of Things. The operation method includes following steps.

S1 step of fixing pedestal 2, aligning a screw 10 with a prefabricated thread recess 9 and turning the screw 10 to make the pedestal 2 fit a wall 1.

S2 step of line pipe placement, placing a line pipe on a rubber blanket 22.

The line pipe pushes the rubber blanket 22 under action of its own gravity, the rubber blanket 22 deforms and fits the line pipe, and the rubber blanket 22 deforms while pushing a supporting plate 21 and an adjusting block 20 to squeeze the adjusting spring 23. In this way, the fixture can support and clamp any size line pipe, and protect a surface of the line pipe during a supporting and clamping process, and avoid damage to galvanized layer on surface of galvanized steel pipe. Therefore, the line pipe can smoothly shield and protect a weak current cable, and then transmission work in weak current project can be carried out normally.

S3 step of clamping and fixing line pipe, aligning a lifting block 5 with a lifting recess 4, aligning a threaded hole 7 with a threaded rod 8, turning a rotating ring 37 while pushing a clamping plate 6 to lower the clamping plate 6, stop pushing the clamping plate 6 and stop rotating the rotating ring 37 when the clamping plate 6 is lowered to a designated position.

The threaded rod 8 rotates in the threaded hole 7 to realize a locking effect of the threaded rod 8 on the clamping plate 6, after a rotation stops, a height of the clamping plate 6 is fixed, the clamping plate 6 uses the clamping rod 8 to push a first clamping block 26 and a protective blanket 36 to complete clamping and fixing of the line pipe, the protective blanket 36 prevents the line pipe from being injured by clamping.

S4 step of tightening line pipe, rotating a threaded clamping rod 30 to push a connecting block 31, a fixing tray 32, a clamping shaft 33, a clamping tray 34, a second clamping block 35 and the protective blanket 36 for tightening and clamping of the line pipe.

The line pipe is further clamped and fixed, stability is greatly improved, while the line pipe is not injured by clamping, so that surface of the line pipe is further protected. Then it further ensures that the line pipe can successfully complete a shielding protection work, so that transmission work in weak current project can be carried out smoothly and normally.

The invention claimed is:

1. A fixture for mounting line pipe comprises a pedestal (2) set on a wall (1), wherein the pedestal (2) is set on the wall (1) by a fixing device, a bracing plate (3) being fixedly connected to a side wall of the pedestal (2) away from the wall (1), an upper end of the bracing plate (3) being provided with a supporting device, a lifting recess (4) being provided on a side wall of the pedestal (2) away from the wall (1), the lifting recess (4) being away from the bracing plate (3), an end of the lifting recess (4) away from the bracing plate (3) penetrating the pedestal (2), a lifting block (5) being slidingly connected to the lifting recess (4), an end of the lifting block (5) away from the lifting recess (4) being fixedly connected with a clamping plate (6), the clamping plate (6) being provided with a clamping device, a threaded hole (7) being provided at an end of the clamping plate (6) away from the lifting block (5), a threaded rod (8) being threaded in the threaded hole (7), an end of the threaded rod (8) close to the bracing plate (3) being rotatably connected to the bracing plate (3), the clamping device comprising a clamping rod (25) fixedly connected to a side wall of the clamping plate (6) close to the bracing plate (3), the clamping rod (25) being arranged opposite to a center of a placing recess (18), an end of the clamping rod (25) close to the placing recess (18) being fixedly connected with a first clamping block (26), two sliding chambers (27) symmetrical to the clamping rod (25) being provided in the clamping plate (6), a side wall of the sliding chamber (27) close to the placing recess (18) and a side wall away from the placing recess (18) each being provided with a communication chamber (28), each end of the two communication chambers (28) away from the sliding chamber (27) penetrating the clamping plate (6), a sliding base (29) being slidingly connected with the sliding chamber (27), an internal thread of the sliding base (29) being penetrated by a threaded clamping rod (25), both ends of the threaded clamping rod (25) penetrating the two communication chambers (28) respectively, an end of the threaded clamping rod (25) close to the placing recess (18) being rotatably connected with a connecting block (31), an end of the connecting block (31) away from the threaded clamping rod (25) being fixedly linked with two symmetrically arranged fixing trays (32), a clamping shaft (33) being fixedly connected between the two fixing trays (32), a rotating tray (34) being rotatably connected to the clamping shaft (33), a second clamping block (35) being fixedly connected to an end of the rotating tray (34) away from the clamping shaft (33), each end of both the second clamping block (35) and the first clamping block (26) close to the placing recess (18) having a protective blanket (36).

2. The fixture for mounting line pipe according to claim 1, wherein the fixing device comprises four prefabricated thread recesses (9) arranged symmetrically with each other on the wall (1), the four prefabricated thread recesses (9) being all threadedly connected with screws (10), each end of the four screws (10) away from the prefabricated thread recesses (9) passing through the pedestal (2), a pressing recess (11) being provided on a side wall of the pedestal (2) close to the wall (1), a pressing plate (12) being slidingly connected to the pressing recess (11), a side wall of the pressing plate (12) away from the wall (1) being provided with a plurality of symmetrically arranged pressing springs (13), an end of each one of the plurality of pressing springs (13) away from the pressing plate (12) being fixedly connected to an inner wall of the pressing recess (11).

3. The fixture for mounting line pipe according to claim 1, wherein the supporting device comprises a bracing recess (14) arranged on a side wall of the bracing plate (3) close to the clamping plate (6), two opposite side walls in the bracing recess (14) both being provided with sliding recesses (15), two sliding blocks (16) being slidingly connected to the two sliding recesses (15), two side walls of the two sliding blocks (16) close to each other being fixedly connected with a holder (17), the holder (17) being slidingly connected to the bracing recess (14), a placing recess (18) being provided on a side wall of the holder (17) away from the bracing recess (14), a plurality of adjusting recesses (19) arranged at equal intervals being provided on an inner wall of the placing recess (18) close to the bracing recess (14), adjusting blocks (20) being slidingly connected to the plurality of adjusting recesses (19), ends of the plurality of adjusting blocks away from the adjusting recess (19) being all fixedly connected with a supporting plate (21), ends of the plurality of supporting plates (21) away from the adjusting block (20) being jointly fixedly connected with a rubber blanket (22), an end of the adjusting block (20) away from the supporting plate (21) being fixedly connected with an adjusting spring (23), an end of the adjusting spring away from the adjusting block (20) being fixedly connected to an inner wall of the adjusting recess (19), a threaded controlling rod (24) being rotatably connected to a side wall of the holder (17) away from the placing recess (18), an end of the threaded controlling rod (24) away from the holder (17) threading through the bracing plate (3).

4. The fixture for mounting line pipe according to claim 1, wherein a rotating ring (37) is fixedly connected to the threaded rod (8), the rotating ring (37) being arranged close to the bracing plate (3).

5. The fixture for mounting line pipe according to claim 1, wherein the lifting recess (4) is T-shaped, a shape of the lifting block (5) matches a shape of the lifting recess (4).

\* \* \* \* \*